United States Patent

Banno

(10) Patent No.: US 11,895,127 B2
(45) Date of Patent: Feb. 6, 2024

(54) VEHICLE COMMUNICATION DEVICE, METHOD OF DETERMINING COMMUNICATION ABNORMALITY, AND STORAGE MEDIUM STORING PROGRAM

(71) Applicant: TOYOTA JIDOSHA KABUSHIKI KAISHA, Toyota (JP)

(72) Inventor: Masahide Banno, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 192 days.

(21) Appl. No.: 17/093,874

(22) Filed: Nov. 10, 2020

(65) Prior Publication Data

US 2021/0160256 A1    May 27, 2021

(30) Foreign Application Priority Data

Nov. 21, 2019 (JP) ................ 2019-210746

(51) Int. Cl.
 *H04L 9/40* (2022.01)
 *H04L 9/32* (2006.01)
 *H04L 12/40* (2006.01)
(52) U.S. Cl.
 CPC ........ *H04L 63/1416* (2013.01); *H04L 9/3242* (2013.01); *H04L 9/3263* (2013.01); *H04L 12/40* (2013.01); *H04L 2012/40215* (2013.01)
(58) Field of Classification Search
 CPC . H04L 63/1416; H04L 9/3242; H04L 9/3263; H04L 12/40; H04L 2012/40215
 USPC ......................................................... 726/24
 See application file for complete search history.

(56) References Cited

U.S. PATENT DOCUMENTS

| 11,496,491 B2* | 11/2022 | Maeda ............... H04L 63/1416 |
| 2012/0253586 A1* | 10/2012 | Sakakibara ........... G07C 5/085 701/29.2 |
| 2014/0350779 A1* | 11/2014 | Yasue .................. G01M 17/00 701/32.8 |
| 2015/0270968 A1 | 9/2015 | Nairn et al. |

(Continued)

FOREIGN PATENT DOCUMENTS

| EP | 2 775 660 A1 | 9/2014 | |
| EP | 3062476 A1 * | 8/2016 | ......... H04L 61/6022 |
| JP | 2018-74435 A | 5/2018 | |

OTHER PUBLICATIONS

Liu, Hongbo., Securing wireless commodity devices, Stevens Institute of Technology, pp. (98-111) (Year: 2013).*

*Primary Examiner* — Bryan F Wright
(74) *Attorney, Agent, or Firm* — Oblon, McClelland, Maier & Neustadt, L.L.P.

(57) ABSTRACT

A vehicle communication device including a processor, wherein the processor: receives first data, and second data that is different from the first data; generates third data based on the received first data and an encryption key; compares the second data and the third data, and authenticates the first data in a case in which the second data and the third data match; and as a result of comparisons that are carried out a plurality of times on receivings that are within a predetermined amount of time after start-up of a vehicle, determines that a case in which the second data and the third data do not match every time is a device abnormal state, and, as a result of the comparisons of the plurality of times, determines that a case that includes matching is a device operating state.

20 Claims, 7 Drawing Sheets

(56) References Cited

U.S. PATENT DOCUMENTS

| | | | |
|---|---|---|---|
| 2015/0302667 A1* | 10/2015 | Punjabi | G07C 5/008 |
| | | | 701/31.4 |
| 2016/0173505 A1 | 5/2016 | Ichihara | |
| 2017/0180370 A1* | 6/2017 | Satoh | H04L 63/1425 |
| 2018/0107473 A1* | 4/2018 | Ahmed | G06F 8/654 |
| 2018/0124180 A1 | 5/2018 | Banno | |
| 2018/0234248 A1* | 8/2018 | Imamoto | H04L 12/40 |
| 2018/0310173 A1* | 10/2018 | Yonemura | H04L 9/30 |
| 2019/0301319 A1* | 10/2019 | Uyama | F02N 11/0814 |

\* cited by examiner

VEHICLE COMMUNICATION DEVICE, METHOD OF DETERMINING COMMUNICATION ABNORMALITY, AND STORAGE MEDIUM STORING PROGRAM

CROSS-REFERENCE TO RELATED APPLICATION

This application is based on and claims priority under 35 USC 119 from Japanese Patent Application No. 2019-210746 filed on Nov. 21, 2019, the disclosure of which is incorporated by reference herein.

BACKGROUND

Technical Field

The present disclosure relates to a vehicle communication device, a method of determining a communication abnormality, and a storage medium storing a program.

Related Art

Japanese Patent Application Laid-Open (JP-A) No. 2018-074435 discloses a vehicle communication device that receives first data relating to a message and second data that is an identifier generated from the first data, and that generates third data on the basis of the received first data and an encryption key that the device has, and that authenticates the first data by comparing the second data and the third data.

In the communication device of JP-A No. 2018-074435, if authentication of the first data fails, it cannot be discriminated whether the reason therefor is an attack such as hacking or the like, or an abnormality unrelated to an attack such as a breakdown of the device or the like.

Therefore, there is the concern that proper measures cannot be taken.

SUMMARY

An object of the present disclosure is to provide a vehicle communication device, a method of determining a communication abnormality, and a storage medium storing a program, which, in a case in which data authentication at the time of receiving data fails, can discriminate that the reason therefor is not an attack such as hacking or the like, and is that there is an abnormality at the device.

A first aspect is a vehicle communication device that includes: a receiving section that receives first data, and second data that is different from the first data; a generating section that generates third data based on the received first data and an encryption key; an authenticating section that compares the second data and the third data, and that authenticates the first data in a case in which the second data and the third data match; and a determining section that, as a result of comparisons that are carried out plural times on receivings that are within a predetermined amount of time after start-up of a vehicle, determines that a case in which the second data and the third data do not match every time is a device abnormal state, and, as a result of the comparisons of the plural times, determines that a case that includes the matching is a device operating state.

In the vehicle communication device of the first aspect, when the first data and the second data are received at the receiving section, the generating section generates the third data on the basis of the first data and the encryption key. For example, the second data and the third data correspond to MACs (Message Authentication Codes). Further, at the vehicle communication device, the authenticating section compares the matches and non-matches of the second data and the third data, and authenticates the first data in the case of a match. If the results of comparison, which are carried out plural times by the determining section on receivings with a predetermined amount of time after starting-up of the vehicle, are all non-matches, the determining section determines that there is a device abnormal state that indicates that there is an abnormality at the device. In a case in which the results include a match, the determining section determines that there is a device operating state that indicates that there are no abnormalities at the device.

Because the probability of incurring an attack such as hacking or the like in the time immediately after start-up of the vehicle is low, a case in which all authentications within the predetermined amount of time after vehicle start-up fail can be considered to be a case in which the device is abnormal. Therefore, in accordance with this vehicle communication device, in a case in which the authenticating of data at the time of receipt fails, it can be discriminated that there is an abnormality at the device.

In a vehicle communication device of a second aspect, in the vehicle communication device of the first aspect, as a result of the comparisons of the plural times, the determining section determines that a case that includes both matching and non-matching is an attack state.

In the vehicle communication device of the second aspect, in a case in which the results of comparisons of plural times include both matches and non-matches, it is determined that there is an attack state in a device operating state. In accordance with this vehicle communication device, because not all of the results of the comparisons that have been carried out plural times are non-matches, there is no abnormality at the device, and it can be discriminated that communication, whose results of comparison are non-matching at a device that is not abnormal, is caused by an attack such as hacking or the like.

In a vehicle communication device of a third aspect, in the vehicle communication device of the first aspect, as a result of the comparisons of the plural times, the determining section determines that a case, which includes matchings of a predetermined number of times and which includes non-matching, is an attack state, and a probability, that the first data will be authenticated over the predetermined number of times due to coincidental matching of the encryption key, is set to be a number of times that is lower than a preset device failure rate.

In the vehicle communication device of the third aspect, the value of the predetermined number of times is set such that the probability, that the first data will be authenticated due to coincidental matching of the encryption key over the predetermined number of times, is lower than a preset device failure rate. Accordingly, even if the encryption keys coincidentally match and the first data is authenticated, if the number of times that authentication has occurred does not reach the predetermined number of times, it is not determined right away that there has not been an attack such as hacking or the like. Therefore, in accordance with this vehicle communication device, the accuracy of determining the device abnormal state can be improved.

In a vehicle communication device of a fourth aspect, in the vehicle communication device of any one of the first through third aspects, in a case in which a result of the comparison is non-matching, the received first data is discarded.

In accordance with the vehicle communication device of the fourth aspect, erroneous control of the vehicle can be suppressed by discarding the first data in the case of a breakdown or in the case of incurring an attack.

A fifth aspect is a method of determining a communication abnormality, including: receiving processing that receives first data, and second data that is different from the first data; generating processing that generates third data based on the received first data and an encryption key; authenticating processing that compares the second data and the third data, and that authenticates the first data in a case in which the second data and the third data match; and determining processing that, as a result of comparisons that are carried out plural times on receivings that are within a predetermined amount of time after start-up of a vehicle, determines that a case in which the second data and the third data do not match every time is a device abnormal state, and, as a result of the comparisons of the plural times, determines that a case that includes matching is a device operating state.

In the method of determining a communication abnormality of the fifth aspect, when the first data and the second data are received in the receiving processing, the third data is generated in the generating processing on the basis of the first data and the encryption key. As described above, MACs are examples of the second data and the third data. Further, in the authenticating processing, the matches and non-matches of the second data and the third data are compared, and the first data is authenticated in the case of a match. In the determining processing, if the results of comparison, which are carried out plural times on receivings that are within a predetermined amount of time after starting-up of the vehicle, are all non-matches, it is determined that there is a device abnormal state which indicates that there is an abnormality at the device. In a case in which the results include a match, it is determined that there is a device operating state which indicates that there are no abnormalities at the device.

As described above, in accordance with this method of determining a communication abnormality, in a case in which the authenticating of data at the time of receipt fails, it can be discriminated that there is an abnormality at the device.

A sixth aspect is a non-transitory storage medium storing a program. The program causes a computer to execute processings including: receiving processing that receives first data, and second data that is different from the first data; generating processing that generates third data based on the received first data and an encryption key; authenticating processing that compares the second data and the third data, and that authenticates the first data in a case in which the second data and the third data match; and determining processing that, as a result of comparisons that are carried out plural times on receivings that are within a predetermined amount of time after start-up of a vehicle, determines that a case in which the second data and the third data do not match every time is a device abnormal state, and, as a result of the comparisons of the plural times, determines that a case that includes matching is a device operating state.

The program, which is stored on a non-transitory storage medium, of the sixth aspect causes a computer to execute the following processings. When the first data and the second data are received in the receiving processing, the third data is generated in the generating processing on the basis of the first data and the encryption key. As described above, MACs are examples of the second data and the third data. Further, in the authenticating processing, the matches and non-matches of the second data and the third data are compared, and the first data is authenticated in the case of a match. In the determining processing, if the results of comparison, which are carried out plural times on receivings that are within predetermined amount of time after starting-up of the vehicle, are all non-matches, it is determined that there is a device abnormal state that indicates that there is an abnormality at the device. In a case in which the results include a match, it is determined that there is a device operating state that indicates that there are no abnormalities at the device.

As described above, in accordance with this program, in a case in which the authenticating of data at the time of receipt fails, it can be discriminated that there is an abnormality at the device.

In accordance with the present disclosure, in a case in which the authenticating of data at the time of receipt fails, it can be discriminated that there is an abnormality at the device that is not caused by an attack such as hacking or the like.

BRIEF DESCRIPTION OF THE DRAWINGS

An exemplary embodiment of the present disclosure will be described in detail based on the following figures, wherein.

DETAILED DESCRIPTION (Communication System)

Figure 1:
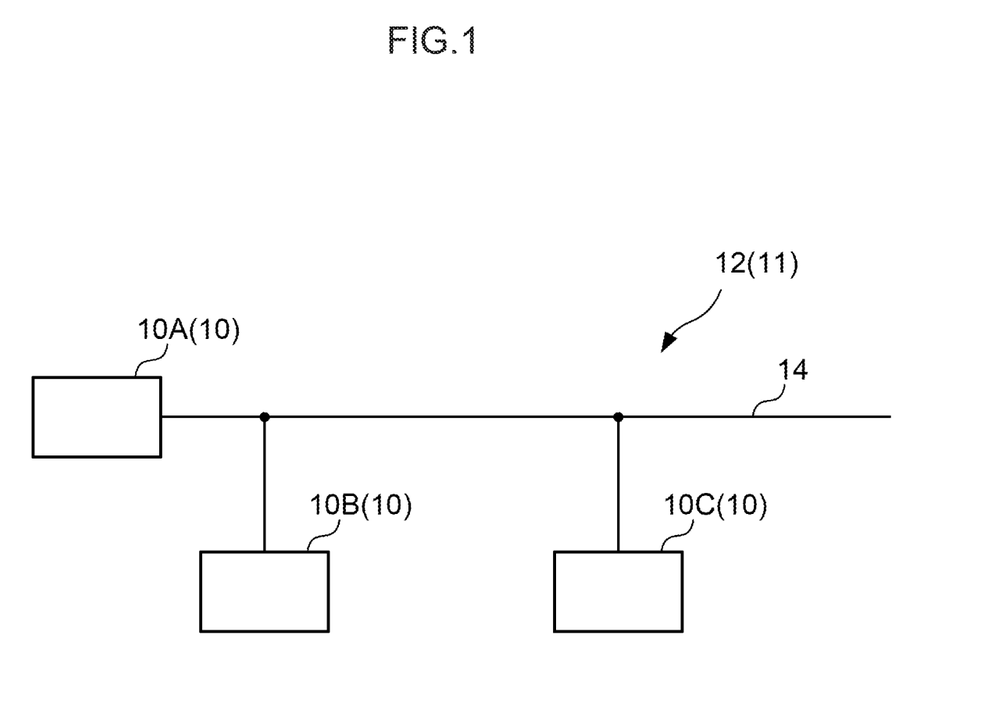
FIG. 1 is a drawing showing the schematic structure of a vehicle communication system relating to an embodiment.

FIG. 1 is a block drawing showing the schematic structure of a vehicle communication system 12 relating to an embodiment. As shown in FIG. 1, the vehicle communication system 12 relating to the present embodiment has plural ECUs (Electronic Control Units) 10 that are vehicle communication devices, and a bus 14 that is a communication path that connects the plural ECUs 10 to one another. The vehicle communication system 12 of the present embodiment is formed, for example, as a network that connects the respective ECUs 10 that are provided at vehicles 11.

Three of the ECUs 10 that are ECU 10A, ECU 10B and ECU 10C are shown in FIG. 1. The ECU 10A corresponds to the master ECU, and the ECUs 10B, 10C correspond to slave ECUs. In the following description, the ECU 10A is the transmitting-side ECU 10 that transmits a communication frame, and the ECUs 10B, 10C are the receiving-side ECUs 10 that receive the communication frame. Note that, not only the ECUs 10A, 10B and 10C, but an even larger number of the ECUs 10 may be connected to the bus 14. Further, the vehicle communication system 12 of the present embodiment employs a bus structure of a bus configuration, but is not limited to this and may employ a bus structure of a star configuration, a ring configuration, or a line configuration (a daisy chain connection).

The vehicle communication system 12 of the present embodiment employs the CAN (Controller Area Network) protocol, or the CAN-FD (CAN with Flexible Data Rate) protocol whose communication speed is faster than that of the CAN protocol, as the communication technique for carrying out communication among the ECUs 10. Note that the communication technique is not limited to this, and LAN standards such as Ethernet (registered trademark) or the like may be employed.

(ECU)

Figure 2:
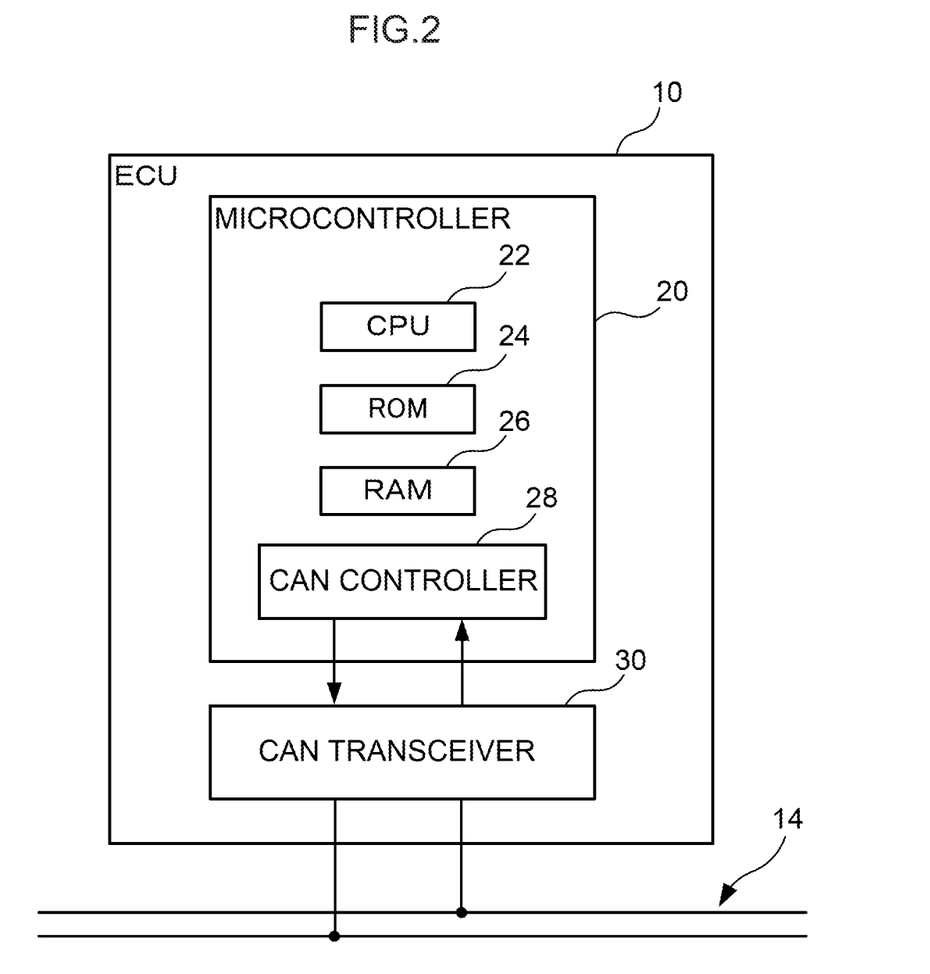
FIG. 2 is a block drawing showing hardware structures of an ECU of the embodiment.

As shown in FIG. 2, the ECU 10 of the present embodiment is structured to include a microcontroller 20 and a CAN transceiver 30. The microcontroller 20 is structured to include a CPU (Central Processing Unit) 22, a ROM (Read Only Memory) 24, a RAM (Random Access Memory) 26, and a CAN controller 28.

The CPU 22 is the central computing processing unit, and executes various programs and controls respective sections. Namely, the CPU 22 reads-out a program from the ROM 24, and executes the program by using the RAM 26 as a workspace. The CPU 22 is an example of the processor. In the present embodiment, an execution program 100 is stored in the ROM 24 (see FIG. 3).

Figure 3:
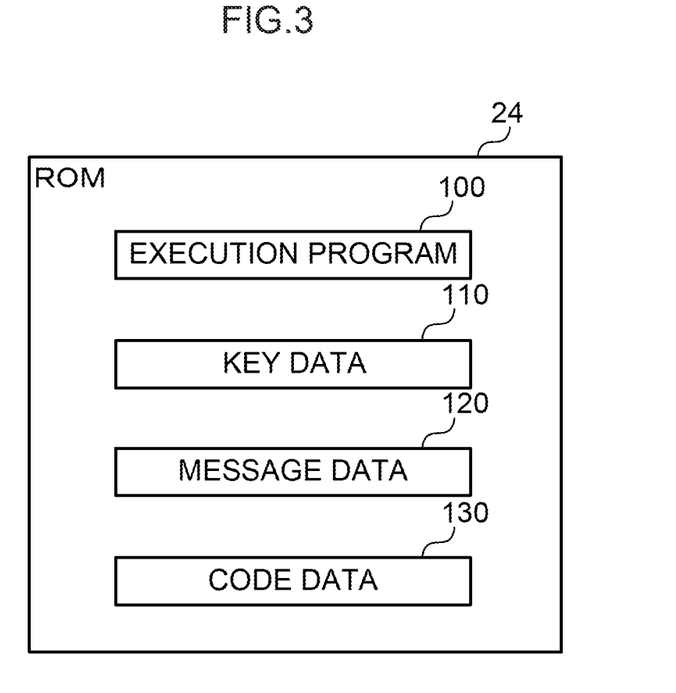
FIG. 3 is a block drawing showing an example of the structure of a ROM of the embodiment.

The ROM 24 that serves as the storage section stores various programs and various data. As shown in FIG. 3, the ROM 24 stores the execution program 100, key data 110, message data 120, and code data 130. Data of an encryption key 52 (see FIG. 5) for generating a MAC (Message Authentication Code) is stored in the key data 110. A message 62 (see FIG. 5) that the ECU 10 is to transmit or has received is stored in the message data 120. A DTC (Diagnostic Trouble Code) that expresses the problem of the device, and a Rob (Record of Behavior) code that expresses the communication abnormality, are stored in the code data 130.

The RAM 26, as a workspace, temporarily stores programs and data.

The CAN controller 28 realizes functions relating to CAN protocol and CAN-FD protocol, e.g., the functions of communication arbitration, error checking, and the like.

The CAN transceiver 30 is connected to the microcontroller 20 and the bus 14, and has the functions of transmitting, to the bus 14, the communication frame that is inputted from the microcontroller 20, and inputting, to the microcontroller 20, the communication frame that is transferred by the bus 14.

Figure 4:
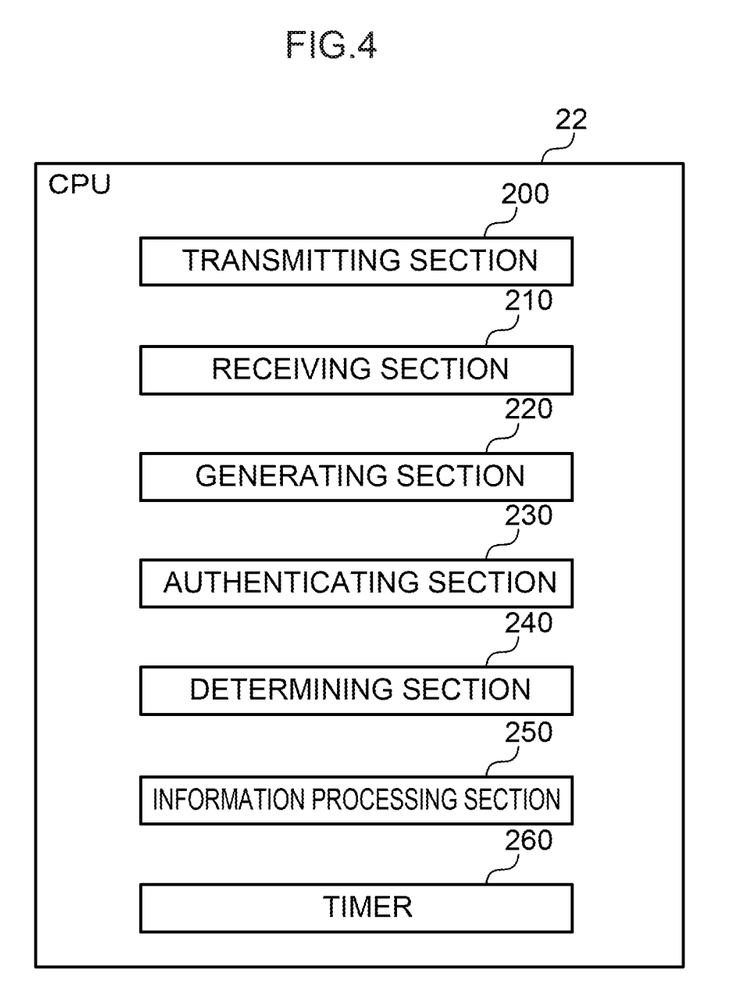
FIG. 4 is a block drawing showing an example of functional structures of a CPU of the embodiment.

FIG. 4 is a block drawing showing an example of the functional structures of the ECU 10. As shown in FIG. 4, the ECU 10 has a transmitting section 200, a receiving section 210, a generating section 220, an authenticating section 230, a determining section 240, an information processing section 250 and a timer 260. These respective functional structures are realized by the CPU 22 reading-out the execution program 100 that is stored in the ROM 24, and executing the execution program 100.

The transmitting section 200 has the function of transmitting communication frames to the other ECUs 10.

Figure 5:
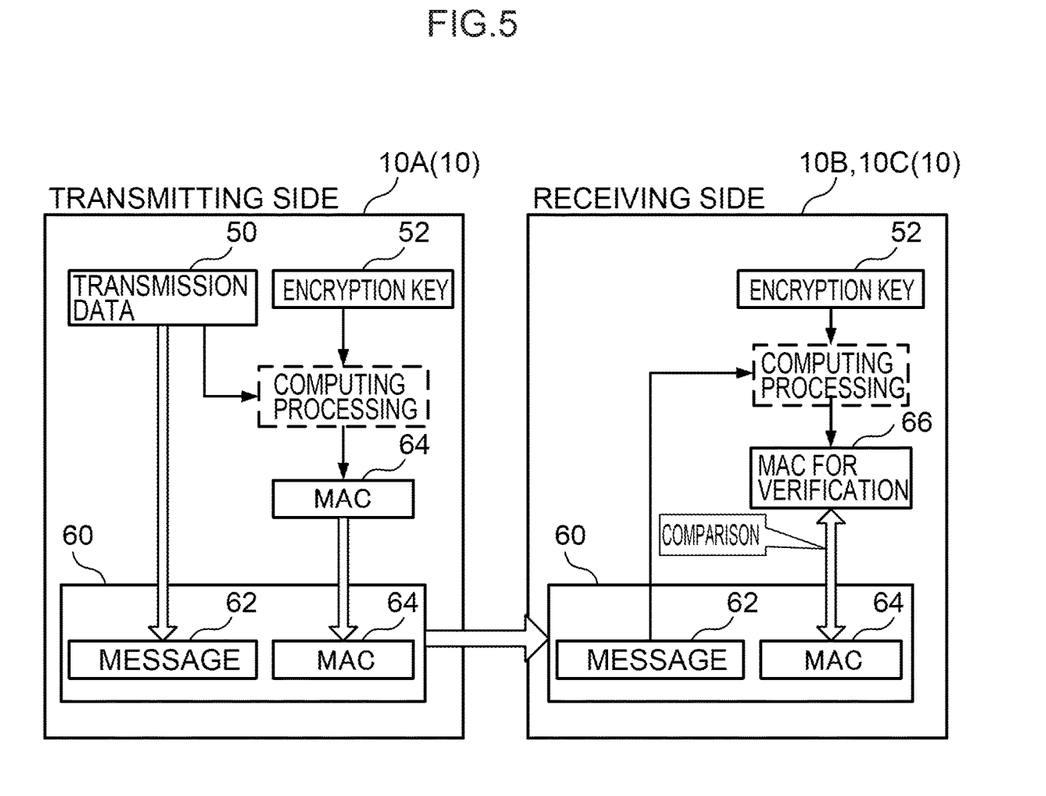
FIG. 5 is a drawing for explaining the flow of data at transmitting-side and receiving-side ECUs.

The receiving section 210 has the function of receiving communication frames from the other ECUs 10. The transmitting section 200 and the receiving section 210 of the present embodiment are controlled on the basis of a communication technique such as CAN protocol or CAN-FD protocol. Therefore, the communication frame includes a CAN ID and communication data 60. As shown in FIG. 5, the communication data 60 includes the message 62 and a MAC 64 that is generated from the message 62.

The generating section 220 has the function of generating the MAC 64 from predetermined data by using the encryption key 52. The generating section 220 of the transmitting-side ECU 10 executes computing processing on the basis of the encryption key 52 and transmission data 50 inputted from sensors and communication devices installed in the vehicle 11, and generates the MAC 64. The generating section 220 of the receiving-side ECU 10 executes computing processing on the basis of the encryption key 52 and the message 62 received from the transmitting-side ECU 10, and generates a MAC 66 for verification. A common encryption key that is used in communication at both the transmitting side and the receiving side is used as the encryption key 52 in the present embodiment. The message 62 is an example of the first data, the MAC 64 is an example of the second data, and the MAC 66 for verification is an example of the third data.

The authenticating section 230 has the function of authenticating the message 62. The authenticating section 230 compares the MAC 64 that is included in the received communication data 60 with the MAC 66 for verification that is generated from the received message 62, and authenticates the message 62 in a case in which they match.

The determining section 240 has the function of determining which among a normal state, an attack state and a device abnormal state, the state of communication at the ECU 10 is in. The normal state is a state in which there are no abnormalities at the ECU 10, and communication at the ECU 10 is normal. The attack state is a state in which, although there are no abnormalities at the ECU 10, the ECU 10 is being subjected to a security attack such as hacking or the like. The device abnormal state is a state in which there is an abnormality at the ECU 10 because the communication function of the ECU 10 has broken-down, or because the encryption keys 52 do not match. Here, "device operating state" includes both the normal state and the attack state.

The determining section 240 of the present embodiment determines the state of communication on the basis of the results of comparing the MACs 64 and the MACs 66 for verification of the communication data 60 that are received within a predetermined amount of time after start-up of the vehicle 11. Concretely, in a case in which the results of plural comparisons of the communication data 60 that are received within a predetermined amount of time are that the MACs 64 and the MACs 66 for verification all match, the determining section 240 determines that there is a normal state which is a device operating state. Further, in a case in which the results of plural comparisons of the communication data 60 that are received during a predetermined amount of time are that matching of the MAC 64 and the MAC 66 for verification occurred a predetermined number of times or more times, and that non-matching is also included, the determining section 240 determines that there is an attack state that is a device operating state. Moreover, in a case in which the results of plural times of comparing the communication data 60 that are received during a predetermined amount of time are that none of the MACs 64 and the MACs 66 for verification match, the determining section 240 determines that there is a device abnormal state.

Here, the "predetermined amount of time" in the present embodiment is the time that is needed from the starting-up of the ECU 10 until preparation of the devices relating to authentication (e.g., the generating section 220 and the authenticating section 230) is completed. Further, the definition of "predetermined number of times" depends on the following. The probability of the messages 62 being authenticated over a predetermined number of times due to the MACs 64 and the MACs 66 for verification coincidentally matching, is set to a number of times that is less than the D-grade failure rate of ASIL (Automotive Safety Integrity Level). The D-grade failure rate of ASIL corresponds to the "preset device failure rate" of the present disclosure.

The information processing section 250 has the function of processing the messages 62 that are acquired from the other ECUs 10 and the sensors of the respective sections. For example, in a case in which the ECU 10 is the ECU of a meter that displays information of the vehicle 11, the information processing section 250 can display information on a panel of the meter on the basis of the received message 62. Further, the information processing section 250 deletes, from the ROM 24 or the RAM 26, the message 62 for which authentication has failed.

The timer 260 has the function of clocking time. The timer 260 of the present embodiment measures the predetermined amount of time from the time when the ECU 10 is started-up.

(Operation)

Figure 6:
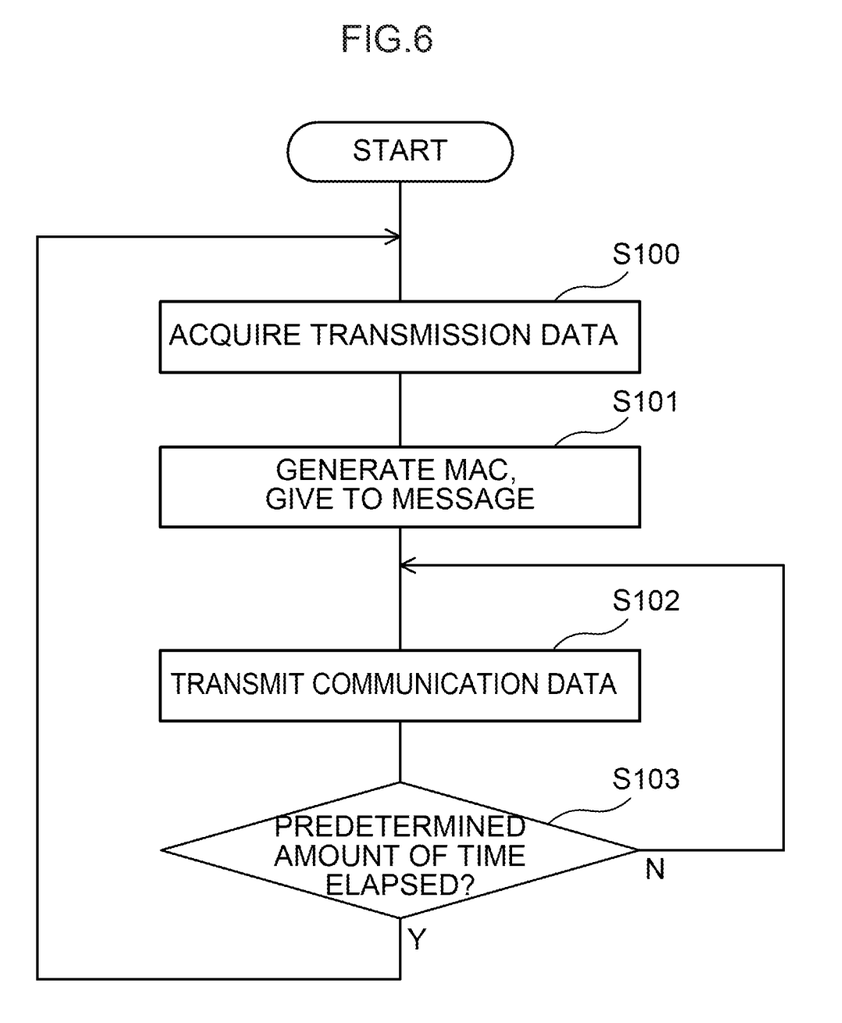
FIG. 6 is a flowchart showing the flow of processings at the transmitting-side ECU.
Figure 7:
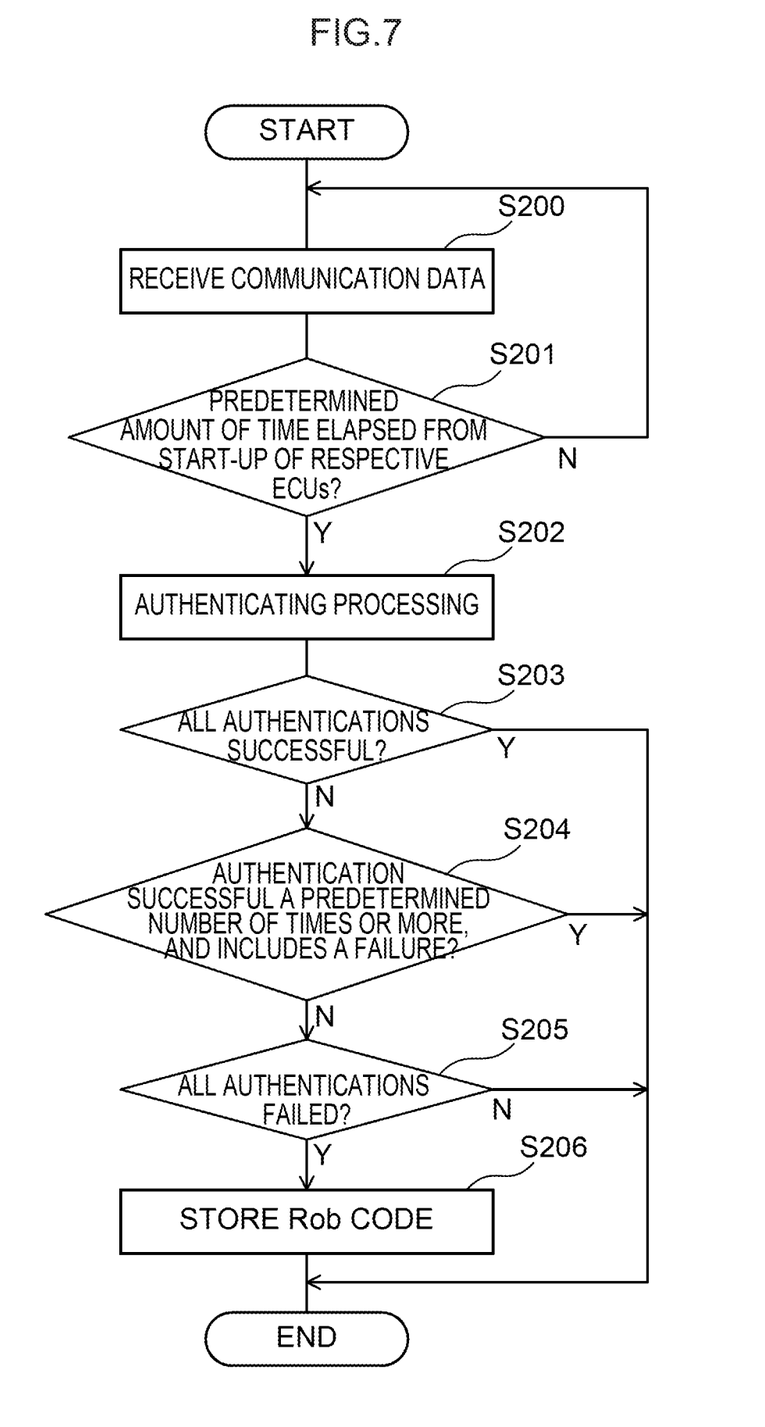
FIG. 7 is a flowchart showing the flow of processings at the receiving-side ECU.

Next, the flows of processings that are executed at the respective ECUs 10 in a case in which the communication data 60 is transmitted from the ECU 10A to the ECU 10B and the ECU 10C in the present embodiment, is described by using the flowcharts of FIG. 6 and FIG. 7. Note that similar processings can be executed also in a case in which the communication data 60 is transmitted from the ECU 10B to the ECU 10A and the ECU 10C, and in a case in which the communication data 60 is transmitted from the ECU 10C to the ECU 10A and the ECU 10B.

Processing based on the following respective steps is executed by the CPU 22 at the ECU 10A at the transmitting side.

In step S100 of FIG. 6, the CPU 22 acquires the transmission data 50. The transmission data 50 that is acquired is the message 62 that includes the communication data 60 (see FIG. 5).

In step S101, the CPU 22 generates the MAC 64, and gives the MAC 64 to the message 62. Namely, the CPU 22 carries out computing processing that is based on the transmission data 50 and the encryption key 52 so as to generate the MAC 64, and gives the generated MAC 64 to the lower bits of the message 62 (see FIG. 5).

In step S102, the CPU 22 transmits, to the receiving-side ECU 10, the communication data 60 that includes the message 62 and the MAC 64.

In step S103, the CPU 22 carries out determination as to whether or not a predetermined amount of time has elapsed. In the vehicle communication system 12 of the present embodiment, the same communication data 60 is transmitted within the predetermined amount of time in order to prevent dropping of the communication data 60 at the receiving-side ECU 10. If the CPU 22 determines that the predetermined amount of time has elapsed, the routine returns to step S100. On the other hand, if the CPU 22 determines that the predetermined amount of time has not elapsed, the routine returns to step S102. Namely, processings are repeated of transmitting the existing communication data 60 until the predetermined amount of time elapses, and, when the predetermined amount of time elapses, transmitting the communication data 60 that is new.

Next, communication abnormality determining processing, which is the method of determining a communication abnormality, is executed by the CPUs 22 at the receiving-side ECU 10B and ECU 10C.

In step S200 of FIG. 7, the CPU 22 receives the communication data 60 from the transmitting-side ECU 10.

In step S201, the CPU 22 determines whether or not a predetermined amount of time has elapsed from the starting-up of the respective ECUs 10. Namely the CPU 22 determines whether or not, from the starting-up of the ECUs 10, a time that is sufficient for completion of preparations for authentication has elapsed. If the CPU 22 determines that the predetermined amount of time has elapsed from the starting-up of the respective ECUs 10, the routine moves on to step S202. On the other hand, if the predetermined amount of time has not elapsed from the starting-up of the respective ECUs 10, the routine returns to step S200. Namely, the CPU 22 repeats receiving of the communication data 60 plural times from the starting-up of the respective ECUs 10 until the predetermined amount of time elapses. The received communication data 60 are temporarily stored in the ROM 24 or the RAM 26.

In step S202, the CPU 22 executes authenticating processing. Namely, the CPU 22 carries out computing processing that is based on the message 62 and the encryption key 52, and generates the MAC 66 for verification, and compares that MAC 66 for verification with the MAC 64 that is included in the communication data 60 (see FIG. 5). This authenticating processing is carried out on all of the communication data 60 that are received.

Thereafter, determination of the state, which is based on the results of comparing the MACs 64 and the MACs 66 for verification, is carried out in step S203 through step S205.

In step S203, the CPU 22 determines whether or not all authentications of the message 62 have been successful. Namely, on the basis of the results of the plural authenticating processings, the CPU 22 determines whether or not the MACs 64 and the MACs 66 lot verification match every time. If the CPU 22 determines that all of the authentications have been successful, the CPU 22 ends the communication abnormality determining processing. In this case, the communication among the respective ECUs 10 is in a normal state that is a device operating state. On the other hand, if the CPU 22 determines that not all of the authentications have been successful, the routine moves on to step S204.

In step S204, determines whether or not the authentications include successes of a predetermined number of times or more, and include a failure. Namely, on the basis of the results of the plural authenticating processings, the CPU 22 determines whether or not there are a predetermined number of times or more cases in which the MAC 64 and the MAC 66 for verification matched, and there has been a case in which the MAC 64 and the MAC 66 for verification do not match. If the CPU 22 determines that authentication has been successful a predetermined number of times or more and that a failure is included, the CPU 22 ends the communication abnormality determining processing. In this case, the communication among the respective ECUs 10 is in an attack state which is a device operating state. On the other hand, if the CPU 22 determines that authentication has not been successful a predetermined number of times or more, and that no failures are included, i.e., that success in authentication has occurred fewer than the predetermined number of times, the routine moves on to step S205.

In step S205, the CPU 22 determines whether or not all of the authentications have failed. Namely, on the basis of the results of the plural authenticating processings, the CPU 22 determines whether or not the MAC 64 and the MAC 66 for verification have not matched every time. If the CPU 22 determines that all of the authentications have failed, the routine moves on to step S206. In this case, the communication among the respective ECUs 10 is a device abnormal state. On the other hand, if the CPU 22 determines that not all of the authentications have failed, the CPU 22 ends the communication abnormality determining processing.

In step S206, the CPU 22 stores the Rob code in the ROM 24. Namely, the CPU 22 stores, in the code data 130, the code that expresses that there has been an abnormality in communication. Then, the communication abnormality determining processing ends.

(Synopsis)

The vehicle communication system 12 of the present embodiment is structured by the plural ECUs 10 that are provided at the vehicles 11 being connected to one another. At the transmitting-side ECU 10, the MAC 64 is generated by carrying out computing processing on the acquired transmission data 50 and the encryption key 52 that the ECU 10 has, and the generated MAC 64 is given to the message 62 that is based on the transmission data 50, and the message 62 is transmitted to the other ECUs 10 as the communication data 60. On the other hand, at the receiving-side ECU 10, the MAC 66 for verification is generated by carrying out computing processing of the message 62 included in the received communication data 60 and the encryption key 52 that the ECU 10 has, and the generated MAC 66 for verification is compared with the received MAC 64. Then, if the MAC 64 and the MAC 66 for verification match, the receiving-side ECU 10 authenticates the message 62.

At the ECU 10 of the present embodiment, the communication state of the ECU 10 is determined from the results of comparison of the MACs 64 and the MACs 66 for verification of the plural communication data 60 that are received during the predetermined amount of time after the starting-up of the vehicle 11. As described above, the "predetermined amount of time" is assumed to be the time that is needed, from the starting-up of the ECU 10, until preparations of the device which relate to authentication are completed. By stopping the authenticating processing during the predetermined amount of time until the preparations of the device relating to authentication are completed, failure of authentication, which is due to failure to generate the MAC 64 and the MAC 66 for verification, and the like are avoided. Accordingly, the communication data 60 that are received within the predetermined amount of time are temporarily stored in the ROM 24 or the RAM 26, and authenticating processing is carried out after the predetermined amount of time has elapsed (see FIG. 7).

Further, it is determined that the communication state between the ECUs 10 is a normal state in a case in which authentication of all of the messages 62 of the communication data 60 that are received during the predetermined amount of time is successful, i.e., in a case in which the results of plural times of comparison of the MACs 64 and the MACs 66 for verification are all matching.

Further, it is determined that the communication state between the ECUs 10 is a device abnormal state in a case in which authentication of all of the messages 62 in the communication data 60 received during the predetermined amount of time fail, i.e., in a case in which the results of plural times of comparison of the MACs 64 and the MACs 66 for verification are all non-matching. Differently than a case in which the power supply is always on such as in the case of a server, during the time immediately after starting-up of the vehicle 11, i.e., during the time immediately after the power of the ECU 10 is turned on, the possibility of incurring an attack such as hacking or the like is low. Therefore, a case in which all of the authentications within a predetermined amount of time after starting-up of the vehicle 11 fail can be considered to be a case in which the ECU 10 is abnormal. In accordance with the present embodiment, it can be discriminated that there is an abnormality at the ECU 10 in a case in which data authentication at the time of receiving fails.

Moreover, it is determined that the communication state between the ECUs 10 is an attack state in a case in which authentications of a predetermined number of times or more of the messages 62 in the communication data 60 received in the predetermined amount of time are successful, but failure of authentication is included, i.e., in a case in which the results of comparing the MACs 64 and the MACs 66 for verification plural times are that there was matching of a predetermined number of times or more and that a failure was included. Because the results of the comparison that is carried out plural times are not that all were non-matches, there is no abnormality at the ECU 10. Therefore, communication, for which there is failure in authentication at the ECU 10 that is not abnormal, can be discriminated as having been caused by an attack such as hacking or the like.

Further, in the present embodiment, the probability of the message 62 being authenticated over a predetermined number of times due to the encryption keys 52 coincidentally matching at the ECUs 10 at both the transmitting and receiving sides, is set to a number of times that is less than the D-grade failure rate of ASIL. Therefore, even if the encryption keys 52 coincidentally match and the message 62 is authenticated, it will not immediately be determined that there are no attacks such as hacking or the like, if the number of times of authentication has not reached the predetermined number of times. Therefore, in accordance with the present embodiment, the accuracy of determining a device abnormal state can be improved.

In the ECU 10 of the present embodiment, the Rob code is stored in the ROM 24 or the RAM 26 in a case in which authentication fails. Further, the DTC is stored in the ROM 24 or the RAM 26 in a case in which the ECU 10 has broken-down. Accordingly, in the case of the device abnormal state, the cause of the abnormality of the ECU 10 can be discovered by reading-out the stored Rob code and DTC.

Concretely, if only the Rob code is stored in the case of a device abnormal state, it can be understood that the encryption keys 52 are different at the transmitting-side ECU 10 and the receiving-side ECU 10. For example, a case in which updating of the encryption key 52 at the ECU 10 of either of the transmitting side or the receiving side by a dealer or the like was forgotten, corresponds to a case in which only the Rob code is stored. Further, if both the Rob code and the DTC are stored in the case of a device abnormal state, it can be understood that that the ECU 10 has physically broken-down. For example, a case, in which the computer that generates the MAC 64 at the transmitting-side ECU 10 breaks-down, corresponds to a case in which both the Rob code and the DTC are stored.

In accordance with the present embodiment, by confirming the code that is stored at the receiving-side ECU 10, it can be specified that the ECU 10 has broken-down physically. Therefore, it is possible to prevent erroneous replacement such as replacement of the ECU 10 in a case in which the communication abnormality is resolved if updating of the encryption key 52 is carried out.

Further, in the present embodiment, because the message 62 in the case of a breakdown or in the case of incurring an attack is discarded, erroneous control of the vehicle 11 is suppressed.

(Notes)

Note that any of various types of processors other than a CPU may execute the various processings that the CPU 22 executes by reading out software (programs) in the above-described embodiment. Examples of processors in this case include PLDs (Programmable Logic Devices) whose circuit structure can be changed after production such as FPGAs (Field-Programmable Gate Arrays) and the like, or dedicated electrical circuits that are processors having circuit structures that are designed for the sole purpose of executing specific processings such as ASICs (Application Specific Integrated Circuits) and the like, or the like. Further, the above-described processings may be executed by one of these various types of processors, or may be executed by combining two or more of the same type or different types of processors (e.g., plural FPGAs, or a combination of a CPU and an FPGA, or the like). Further, the hardware structures of these various types of processors are, more concretely, electrical circuits that combine circuit elements such as semiconductor elements and the like.

Further, the above embodiment describes a form in which programs are stored in advance (are installed) in a non-transitory storage medium that can be read by a computer. For example, the execution program 100 is stored in advance in the ROM 24. However, the present disclosure is not limited to this, and the execution program 100 may be provided in a form of being recorded on a non-transitory storage medium such as a CD-ROM (Compact Disc Read Only Memory), a DVD-ROM (Digital Versatile Disc Read Only Memory), a USB (Universal Serial Bus) memory, or the like. Further, the execution program 100 may be in a form of being downloaded from an external device via a network.

The flow of processings described in the above embodiment are examples, and unnecessary steps may be deleted, new steps may be added, or the order of processings may be rearranged, within a scope that does not depart from the gist of the present disclosure.

What is claimed is:

1. A vehicle communication device, comprising:
    a hardware processor configured to:
        receive a plurality of first data and a plurality of second data respectively corresponding to each of the plurality of first data;
        generate a plurality of third data based on each of the received plurality of first data and an encryption key;
        collect a group of the plurality of second data received within a predetermined amount of time after start-up of a vehicle;
        compare each of the group of the plurality of second data received within the predetermined amount of time after the start-up of the vehicle and a corresponding third data of the plurality of third data to authenticate a corresponding first data of the plurality of first data; and
        as a result of the comparisons between each of the group of the plurality of second data received within the predetermined amount of time after the start-up of the vehicle and the corresponding third data:
            determine that a device is in an abnormal state if all of the comparisons do not match,
            determine that the device is an attacked state if a part less than all of the comparisons do not match, and
            determine that the device is in a normal state if all of the comparisons do match, wherein
        the abnormal state is not the attacked state, and
        the abnormal state is a state indicating that there is a failure in a communication function of the device or a state indicating an abnormality where the encryption keys do not match.

2. The vehicle communication device of claim 1, wherein, in a case in which a result of one of the comparisons is non-matching, the processor is configured to discard the corresponding first data.

3. The vehicle communication device of claim 1, wherein, in a case in which the processor determines that the device is in the abnormal state, a code that expresses that there is an abnormality is stored in a storage section.

4. The vehicle communication device of claim 3, wherein the code includes a DTC (Diagnostic Trouble Code) and a Rob (Record of Behavior) code that expresses a communication abnormality.

5. A method of determining a communication abnormality, comprising:
    receiving a plurality of first data and a plurality of second data respectively corresponding to each of the plurality of first data;
    generating a plurality of third data based on each of the received plurality of first data and an encryption key;
    collecting a group of the plurality of second data received within a predetermined amount of time after start-up of a vehicle;
    comparing each of the group of the plurality of second data received within the predetermined amount of time after the start-up of the vehicle and a corresponding third data of the plurality of third data to authenticate a corresponding first data of the plurality of first data; and
    as a result of the comparisons between each of the group of the plurality of second data received within the predetermined amount of time after the start-up of the vehicle and the corresponding third data:
        determining that a device is in an abnormal state if all of the comparisons do not match,
        determining that the device is an attacked state if a part less than all of the comparisons do not match, and
        determining that the device is in a normal state if all of the comparisons do match, wherein
    the abnormal state is not the attacked state, and
    the abnormal state is a state indicating that there is a failure in a communication function of the device or a state indicating an abnormality where the encryption keys do not match.

6. A non-transitory storage medium storing a program that causes a computer to execute processing, the processing comprising:
    receiving a plurality of first data and a plurality of second data respectively corresponding to each of the plurality of first data;
    generating a plurality of third data based on each of the received plurality of first data and an encryption key;
    collecting a group of the plurality of second data received within a predetermined amount of time after start-up of a vehicle;
    comparing each of the group of the plurality of second data received within the predetermined amount of time after the start-up of the vehicle and a corresponding third data of the plurality of third data to authenticate a corresponding first data of the plurality of first data; and
    as a result of the comparisons between each of the group of the plurality of second data received within the predetermined amount of time after the start-up of the vehicle and the corresponding third data:
        determining that a device is in an abnormal state if all of the comparisons do not match,
        determining that the device is an attacked state if a part less than all of the comparisons do not match, and determining that the device is in a normal state if all of the comparisons do match, wherein the abnormal state is not the attacked state, and the abnormal state is a state indicating that there is a failure in a communication function of the device or a state indicating an abnormality where the encryption keys do not match.

7. The vehicle communication device of claim 1, wherein the predetermined amount of time is a time that is needed from a starting-up of an electronic control unit including the hardware processor until preparation of the hardware processor for authentication is completed.

8. The vehicle communication device of claim 1, wherein a number of the comparisons is set such that the number of the comparisons per an amount of time is less than a preset device failure rate.

9. The vehicle communication device of claim 8, wherein the preset device failure rate is the D-grade failure rate of ASIL (Automotive Safety Integrity Level).

10. The vehicle communication device according to claim 1, wherein each of the abnormal state, the attacked state, and the normal state is able to be separately determined as one state in which the device is in.

11. The vehicle communication device according to claim 1, wherein the abnormal state is the state indicating that there is the failure in the communication function of the device has broken down, the normal state is a state indicating that there is no failure in the communication function of the device, and the attacked state is a state in which there are no abnormalities at the device.

12. The vehicle communication device according to claim 1, wherein each of the abnormal state, the attacked state, and the normal state is able to be separately determined as one state in which the device is in, the abnormal state is the state indicating the abnormality at the device, the normal state is a state indicating that there are no abnormalities at the device, and the attacked state is a state indicating that there are no abnormalities at the device.

13. The vehicle communication device according to claim 1, wherein the attacked state is a state indicating that the device is being subjected to a security attack.

14. The vehicle communication device according to claim 11, wherein the attacked state is a state indicating that the device is being subjected to a security attack.

15. The vehicle communication device according to claim 12, wherein the attacked state is a state indicating that the device is being subjected to a security attack.

16. The vehicle communication device according to claim 1, wherein each of the abnormal state and the normal state relate to functionalities of the device, and the attacked state relates to forces external to the device.

17. The vehicle communication device according to claim 11, wherein the attacked state relates to forces external to the device.

18. The vehicle communication device according to claim 13, wherein the attacked state relates to forces external to the device.

19. The vehicle communication device according to claim 1, wherein each of the abnormal state and the normal state relate to functionalities of the device, and the attacked state is a state indicating that the device is being subjected to an intended intrusion.

20. The vehicle communication device according to claim 1, wherein the attacked state is a state indicating that the device is being subjected to an intended intrusion.

* * * * *